United States Patent Office 2,890,188
Patented June 9, 1959

2,890,188

SILOXANE ELASTOMERS COMPOUNDED WITH HYDROXYLATED SILANES

George M. Konkle, James A. McHard, and Keith E. Polmanteer, Midland, Mich., assignors to Dow Corning Corporation, Midland, Mich., a corporation of Michigan No Drawing. Application December 17, 1951
Serial No. 262,178

11 Claims. (Cl. 260—29.1)

This invention relates to improved vulcanizeable siloxane compositions and to the elastomers made therefrom.

One of the outstanding improvements in siloxane elastomers resulted from the discovery that certain silicas were reinforcing when incorporated in siloxane polymers. The use of these silicas results in superior elastomers. These materials are described in U.S. Patent 2,541,137. Such elastomers have met wide acceptance by industry. However, the use of reinforcing silicas introduced a new problem in the production of siloxane elastomers. This problem resulted from the fact that reinforcing silica fillers cause hardening of the compounded materials prior to vulcanization. This hardening occurs even at room temperature and is called "crepe aging." The compounded materials may harden during shipment or storage to the point where they cannot be fabricated.

Various methods have been devised to stop this phenomena. Among these have been the use of chlorosilanes to treat the reinforcing silicas prior to incorporation in the elastomers. Whereas this method is effective, it necessitates the handling of large volumes of finely divided silicas and it involves treating these materials with corrosive agents. Consequently, the cost involved is considerable. Another method devised was that of adding chlorosilanes to silica organo gels and then evaporating the solvent at atmospheric pressure. This produces finely divided silicas which were suitable for use in the elastomers. This method, however, involves the use of large amounts of solvents with all the difficulties inherent thereto.

It is an object of this invention to provide a simple method of preventing the premature hardening of siloxane polymers containing reinforcing silicas without the necessity of treating the silica. Another object is to provide a superior siloxane elastomer. Other objects and advantages will be apparent from the following description.

This invention relates to a composition of matter comprising (1) a benzene-soluble organopolysiloxane having a viscosity of at least 10,000 cs. at 25° C.; (2) a hydroxylated organosilane in amount of from 1 percent to 100 percent by weight of (2) based upon the weight of (1); (3) a silica filler having a pore volume of at least 3 ccs. per gram and a heat of wetting by hexamethyldisiloxane of at least 0.1 calorie per cc. of pore volume, said filler being employed in amount from 10 to 90 parts per 100 parts of (1); and (4) a vulcanizing agent in amount from 1 to 10 parts per 100 parts of (1).

The polysiloxane (1) employed in this invention may range in viscosity of 10,000 cs. up to nonflowing benzene-soluble polymers. The polymers are essentially diorganopolysiloxanes and are preferably either dimethylpolysiloxane or copolymers of dimethylpolysiloxane with phenylmethylsiloxane and/or diphenylsiloxane. In those cases in which phenylsiloxanes are incorporated into the polymers, it is preferred that they be present in amount less than 35 mol percent. Polymers of the above types are well known in the art.

The hydroxylated organosilane (2) employed in this invention contains from 1 silicon bonded hydroxyl per 70 silicon atoms to 2 silicon bonded hydroxyls per silicon atom and contains from 1.9 to 2.1 hydrocarbon radicals per silicon atom. The remaining valences (if any) of the silicon atoms are satisfied by oxygen atoms. The hydroxylated materials includue both monomers such as diphenyldiol and polymeric materials which contain a relatively few silicon-bonded OH groups in the molecule. In addition the hydroxylated organosilane may be a mixture of hydroxyl-containing siloxanes and completely condensed siloxanes. In any event, the ratio of silicon-bonded hydroxyls to silicon atoms in the hydroxylated material is from 1 OH to 70 silicon to 2 OH per silicon.

The hydrocarbon radicals in the hydroxylated silane are attached to the silicon by carbon-silicon linkages and these radicals include both alkyl radicals, preferably of less than 6 carbon atoms and monocyclicaryl hydrocarbon radicals. The ratio of these radicals to silicon should be between 1.9 and 2.1. Thus the silane may contain units of the type $RSi\equiv$, $R_2Si=$, and $R_3Si-$. Any proportions of the above type units may be present provided the ratio of hydrocarbon radicals to silicon atoms is in the above defined range.

The physical state of the hydroxylated silane may vary from crystalline material such as diphenylsilanediol, to viscous resinous materials. It is preferred that the material be soluble in benzene or other hydrocarbon solvents since tough insoluble gums are not readily dispersible in the polysiloxane (1).

Specific examples of hydroxylated silanes which are operative in the invention are diphenylsilanediol, phenylmethylsilanediol, hydroxylated dimethylpolysiloxanes, hydroxylated phenylmethylpolysiloxanes, hydroxylated diphenylpolysiloxanes, hydroxylated diethylpolysiloxanes, hydroxylated tolylmethylsiloxanes, hydroxylated hexylmethylsiloxanes, hydroxylated dipropylsiloxanes, and hydroxylated copolymers containing dimethyl-, monomethyl- and trimethylsiloxane units. It is to be understood that the hydroxylated siloxanes may be those in which each molecule has silicon bonded hydroxyl groups therein or they may be mixtures containing molecules with silicon bonded hydroxyl groups and molecules of completely condensed organosiloxanes. The latter may be either cyclic siloxanes or linear siloxanes in which the molecules are end-blocked with $R_3Si-$ groups. For example, the hydroxylated methylpolysiloxane may be mixtures of siloxanes of the formula $HO[(CH_3)_2SiO]_xH$ and siloxanes of the formula $[(CH_3)_2SiO]_x$.

The above hydroxylated siloxanes (2) are employed in amount from 1 percent to 100 percent based on the weight of the polysiloxane (1). In all cases, however, the viscosity of the mixture should be at least 10,000 cs. at 25° C. If the hydroxylated material is employed in amount less than 1 percent there is relatively little effect upon the properties of the compounded material.

The hydroxylated silanes (2) may be prepared by any suitable method. These include heating siloxanes with steam under pressure at temperatures of about 120° C. and hydrolyzing silanes of the formula $R_nSiX_{4-n}$ where X is any hydrolyzable group such as Cl, OR, H, —OOR, etc. The former method is preferred for the preparation of those hydroxylated materials in which the hydrocarbon radicals are alkyl while the latter method is best for those containing monocyclicaryl hydrocarbon radicals.

The silica fillers employed herein include any silica having a pore volume of at least 3 ccs. per gram and a heat of wetting in hexamethyldisiloxane of at least 0.1 calorie per cc. of pore volume. The preferred silicas are those which have heats of wetting in hexamethyldisiloxane of from 0.1 to 1.8 calories per cc. of pore volume. The method of determining heats of wetting and pore volumes of silicas is described in U.S. Patent 2,541,137. In that patent the heats of wetting are described as determined in water but the procedure of determing the heats of wetting in hexamethyldisiloxane is identical.

Examples of commercial silicas which posses the above defined properties are silica aerogels and fume silicas (i.e. those prepared by burning volatile silanes).

Any suitable vulcanizing agent may be employed in the compounds of this invention. Suitable vulcanizing agents include organic peroxides such as tertiary butyl perbenzoate, benzoyl peroxide, and tertiary butyl peracetate and inorganic materials such as zirconyl nitrate. Preferably the vulcanizing agent should be employed in amount of from 1 to 10 parts per 100 parts of the siloxane (1).

The incorporation of the hydroxylated siloxanes into the composition of this invention produces materials which remain millable indefinitely. The effect of the hydroxylated fluid is independent of the order in which it is incorporated into the material. For example, the hydroxylated siloxanes may be added to the silica filler and the treated filler may then be incorporated into the siloxane polymer. Alternatively, the hydroxylated siloxane (2) may be incorporated in the polysiloxane (1) and the silica added thereafter. Again the filler and hydroxylated siloxane may be added simultaneously to the polysiloxane (1). If desired, solvent may be employed to aid in the dispersion of hydroxylated polysiloxane, although there is no particular advantage in employing solvents. The vulcanizing agent can be added to the mixture at any time.

The above defined ingredients may be mixed in any desired fashion although excellent results are obtained by milling.

The compounded materials are converted into siloxane elastomers by heating at a temperature of at least 100° C. (i.e. above the decomposition point of the vulcanizing agent), until a non-tacky coherent material is obtained. In general, a heating time of from 3 to 5 minutes is sufficient. Thereafter the vulcanized elastomer may be further cured by heating at a temperature up to 250° C.

The elastomers prepared by the method of this invention have tensile strengths ranging up to 1000 p.s.i. and elongations up to 700 percent. The stronger elastomers are obtained by employing high molecular weight diorganosiloxane polymers which are nonflowing and benzene-soluble. However, in many applications it is advantageous to employ low molecular weight polymers, for example, those which have viscosities of 10,000 to 1,000,000 cs.

In addition to the elimination of "crepe aging," the incorporation of the hydroxylated siloxanes produces elastomers which are of superior thermostability to those prepared without the hydroxylated silanes. Siloxane elastomers are well known commercial materials of known utility.

The following examples are illustrative only and are not to be construed as limiting the invention which is properly delineated in the appended claims. In the examples the plasticity of the polymers was determined according to the American Society for Testing Materials test D926–47 T, except that a 4.2 gram sample was employed in the test, while the durometer values were determined by test D676-49 T of the Society.

Example 1

A polymeric dimethylsiloxane having a plasticity of 58 was milled with 42 parts of a fume silica, ½ part ferric oxide, 9.65 parts of a fluid phenylmethylsiloxane having a hydroxyl content of 3 percent by weight, and 1.5 parts benzoyl peroxide. The compounded material was then vulcanized by heating 5 minutes at 125° C. in a press. The "as molded" physical properties were as follows: durometer 37, tensile strength in p.s.i. 823, and elongation 800 percent at break. Upon curing the sample for 24 hours at 250° C. it had a durometer of 52, a tensile strength of 627 p.s.i. and an elongation of 500 percent at break.

The above compounded unvulcanized polymer was allowed to stand for 4 weeks at room temperature and was still millable.

Example 2

A cohydrolyzate was prepared by cohydrolyzing a mixture of dimethyldichlorosilane and phenylmethyldichlorosilane. The resulting polymer had a hydroxyl content of 3.9 percent by weight.

5.6 parts of the above cohydrolyzate was milled with 100 parts of a dimethylpolysiloxane having a plasticity of 49, 35 parts of a fume silica, and 1½ parts of benzoyl peroxide. The compounded material was vulcanized by heating at 125° C. for 5 minutes in a press and the resulting elastomer had a durometer of 48, tensile 917 p.s.i. and an elongation at break of 936 percent. After heating for 24 hours at 250° C., the durometer was 49, the tensile was 736 p.s.i. and the elongation at break was 527 percent.

The compounded unvulcanized material did not harden upon standing.

Example 3

100 parts of a dimethylpolysiloxane having a plasticity of 51 was milled with 45 parts of a fume silica, 1½ parts ferric oxide, 1½ parts of benzoyl peroxide, and 34.04 parts of a fluid hydroxylated dimethylpolysiloxane having a hydroxyl content of 0.45 percent by weight. The resulting elastomer was vulcanized in the usual manner and then cured for 1 hour at 250° C. and the resulting elastomer had a durometer of 29, a tensile of 672 p.s.i. and an elongation at break of 600 percent. The material was then cured further for 24 hours at 250° C. and the resulting elastomer had a durometer of 38, a tensile of 628 p.s.i. and an elongation at break of 420 percent.

The above compounded unvulcanized material was usable after 4 weeks' standing at room temperature.

Example 4

100 parts of dimethylpolysiloxane having a plasticity of about 50, 35 parts of a fume silica, 3 parts of tertiary butyl perbenzoate and 5 parts of diphenylsilanediol were milled together. The material was vulcanized by heating 10 minutes at 150° C. The resulting elastomer had a durometer of 32, tensile of 910 p.s.i. and an elongation at break of 878 percent. After 24 hours at 250° C. the material had a durometer of 68, tensile 868 p.s.i. and an elongation at break of 180 percent.

At the end of 4 weeks, the compounded unvulcanized material could be milled easily.

Example 5

100 parts of dimethylpolysiloxane having a plasticity of 51, was milled with 45 parts of a silica aerogel known as "Santocel C," 7½ parts of hydrolyzed dimethylpolysiloxane fluid having a hydroxyl content of 3.1 percent by weight and 1½ parts of benzoyl peroxide. The resulting material was vulcanized by heating 5 minutes at 125° C. and the resulting elastomer had a durometer of 52, a tensile of 977 p.s.i. and an elongation at break of 723 percent. After 24 hours at 250° C. the durometer was 65, the tensile 669 p.s.i. and the elongation at break was 400 percent.

The compounded unvulcanized material did not "crepe age."

Example 6

100 parts of a copolymeric siloxane having a plasticity of 56 and being composed of 5 mol percent phenylmethylsiloxane and 95 mol percent dimethylsiloxane was milled with 35 parts of a fume silica, 5 parts of a dimethylsiloxane fluid having a hydroxyl content of 3.1 percent by weight, and 1.5 parts benzoyl peroxide. The compounded material was vulcanized by heating 5 minutes at 125° C. The resulting elastomer had a durometer of 30, a tensile of 898 p.s.i. and an elongation at break of 737 percent. After 24 hours at 250° C. the durometer was 53, tensile 857 p.s.i. and elongated at break 420 percent.

The unvulcanized compounded material stood for 1 month at room temperature and was still usable.

Example 7

100 parts of a copolymeric siloxane composed of 5 mol percent diphenylsiloxane and 95 mol percent dimethylsiloxane having a plasticity of 106 was milled with 45 parts of fume silica, 10 parts of a hydroxylated dimethylpolysiloxane fluid having a hydroxyl content of 3.22 percent and 1½ parts of benzoyl peroxide. After the material was vulcanized 5 minutes at 125° C. the resulting elastomer had a durometer of 51, a tensile of 1209 p.s.i. and an elongation of 670 percent. After 24 hours at 250° C. the durometer was 63, the tensile was 650 p.s.i. and the elongation at break was 393 percent.

After 1 month's standing at room temperature, the compounded unvulcanized material was still usable.

Example 8

100 parts of a 10,000 cs. copolymeric siloxane having a composition of 5 mol percent phenylmethylsiloxane and 95 mol percent dimethylsiloxane was milled with 45 parts of a fume silica, 9 parts of a hydroxylated dimethylpolysiloxane fluid having a hydroxyl content of 3.22 and 3 parts benzoyl peroxide. The material was vulcanized in the usual manner and then cured at 250° C. whereupon the resulting elastomer had a durometer of 71, tensile of 565 p.s.i. and an elongation at break of 250 p.s.i. After 24 hours at 150° C. the durometer was 77, the tensile was 620 p.s.i. and the elongation at break was 120 percent.

The compounded unvulcanized material was still usable after 1 month at room temperature.

Example 9

A finely divided silica was prepared by vaporizing trichlorosilane in a stream of nitrogen and bubbling the effluent vapors through water at room temperature. The silica was collected and filtered and washed free of acid. 40 parts of the silica, 100 parts of a dimethylpolysiloxane having a plasticity of 50, 10 parts of a polymeric dimethylsiloxane fluid containing 3.22 percent silicon bonded hydroxyls, and 2 parts of benzoyl peroxide were compounded on a rubber mill. The compounded material was then cured in a press for 5 minutes under 20 lbs. steam, followed by 1 hour at 250° C. The resulting elastomer had a durometer reading of 47, a tensile of 401 p.s.i. and elongation at break was 183 percent.

The compounded unvulcanized material showed no signs of hardening after 1 day. By comparison, the identical unvulcanized compound containing no hydroxylated fluid had hardened appreciably at the end of 24 hours.

Example 10

120 grams of a fume silica was stirred with a solution of 40 grams of a dimethylpolysiloxane fluid containing 3 percent by weight silicon bonded OH. The solution was a 2.5 percent by weight solution of the polysiloxane in methylene chloride. The solvent was removed by evaporation.

50 parts of the above treated silica was compounded with 100 parts of a dimethylpolysiloxane having a plasticity of 50, 1½ parts benzoyl peroxide, and 3 parts tertiary butyl perbenzoate both based on the weight of the polysiloxane. The material was vulcanized in the usual manner and the material had an "as molded" tensile strength of 922 p.s.i., an elongation at break of 507 percent, and a durometer of 47. After 24 hours at 250° C. the tensile was 802 p.s.i., elongation at break 182 percent and the durometer was 68.

The compounded unvulcanized material showed no "crepe aging" after 4 weeks' sanding at room temperature.

That which is claimed is:

1. A composition of matter composed of: (1) a benzene-soluble organopolysiloxane, having a viscosity of at least 10,000 cs. at 25° C., said siloxane being composed of dimethylpolysiloxane and from 0 to 35 mol percent of a siloxane selected from the group consisting of phenylmethylsiloxane and diphenylsiloxane; (2) a hydroxylated organosilane in amount from 1 percent to 100 percent by weight of (2) based on the weight of (1), said hydroxylated silane having a silicon bonded OH content of from 1 OH per 70 silicon atoms to 2 OH per silicon atom and having from 1.9 to 2.1 hydrocarbon radicals per silicon atom, said radicals being selected from the group consisting of alkyl radicals of less than 6 carbon atoms, and monocyclicaryl hydrocarbon radicals, any remaining valences of the silicon atoms in said hydroxylated silane being satisfied by oxygen atoms; (3) a silica filler having a pore volume of at least 3 ccs. per gram and a heat of wetting by hexamethyldisiloxane of at least 0.1 calorie per cc. of pore volume, said filler being employed in amount from 10 to 90 parts per 100 parts of (1) and (4) a vulcanizing agent in amount from 1 to 10 parts per 100 parts of (1).

2. A composition in accordance with claim 1 in which the silica filler has a pore volume of at least 3 ccs. per gram and a heat of wetting by hexamethyldisiloxane of from 0.1 to 1.8 calories per cc. of pore volume.

3. A composition in accordance with claim 1 in which the hydrocarbon radicals of the hydroxylated silane (2) are methyl radicals and in which the silica filler has a pore volume of at least 3 ccs. per gram and a heat of wetting by hexamethyldisiloxane of from 0.1 to 1.8 calories per cc. of pore volume.

4. A composition in accordance with claim 1 in which the hydrocarbon radicals of the hydroxylated silane (2) are both methyl and phenyl radicals and in which the silica filler has a pore volume of at least 3 ccs. per gram and a heat of wetting by hexamethyldisiloxane of from 0.1 to 1.8 calories per cc. of pore volume.

5. A composition in accordance with claim 1 in which the hydrocarbon radicals of the hydroxylated silane (2) are phenyl radicals and in which the silica filler has a pore volume of at least 3 ccs. per gram and a heat of wetting by hexamethyldisiloxane of from 0.1 to 1.8 calories per cc. of pore volume.

6. A siloxane elastomer composed of (1) an benzene soluble organopolysiloxane, having a viscosity of at least 10,000 cs. at 25° C., which is composed of dimethylsiloxane and from 0 to 35 mol percent of a siloxane selected from the group consisting of phenylmethylsiloxane and diphenylsiloxane, (2) a hydroxylated organosilane in amount of from 1 percent to 100 percent by weight of (2) based upon the weight of (1) said hydroxylated silane having a silicon bonded OH content of from 1 OH per 70 silicon atoms to 2 OH per silicon atom and having from 1.9 to 2.1 hydrocarbon radicals per silicon atom, said radicals being selected from the group consisting of alkyl radicals of less than 6 carbon atoms and monocyclicaryl hydrocarbon radicals, any remaining valencies of the silicon atoms in said hydroxylated silane being satisfied by oxygen atoms and (3) a silica filler having a pore volume of at least 3 ccs. per gram and a heat of wetting by hexamethyldisiloxane of at least 0.1 calorie per cc. of pore volume, said filler being employed in amount from 10 to 90 parts per 100 parts of (1).

7. An elastomer in accordance with claim 6 in which the silica filler has a pore volume of at least 3 ccs. per gram and a heat of wetting by hexamethyldisiloxane of from 0.1 to 1.8 calories per cc. of pore volume.

8. An elastomer in accordance with claim 6 in which the hydrocarbon radicals of the hydroxylated silane (2) are methyl radicals and in which the silica filler has a pore volume of at least 3 ccs. per gram and a heat of wetting by hexamethyldisiloxane of from 0.1 to 1.8 calories per cc. of pore volume.

9. An elastomer in accordance with claim 6 in which the hydrocarbon radicals of the hydroxylated silane (2) are both methyl and phenyl radicals and in which the silica filler has a pore volume of at least 3 ccs. per gram and a heat of wetting by hexamethyldisiloxane of from 0.1 to 1.8 calories per cc. of pore volume.

10. A composition in accordance with claim 6 in which the hydrocarbon radicals of the hydroxylated silane (2) are phenyl radicals and in which the silica filler has a pore volume of at least 3 ccs. per gram and a heat of wetting by hexamethyldisiloxane of from 0.1 to 1.8 calories per cc. of pore volume.

11. A composition of matter which comprises (1) a methylpolysiloxane convertible to the cured, solid, elastic state and containing an average of about 2 methyl groups per silicon atom, (2) a finely divided silicon dioxide, (3) benzoyl peroxide and (4) from about 1% to about 10% by weight, based on the weight of said methylpolysiloxane of diphenylsilanediol.

References Cited in the file of this patent

UNITED STATES PATENTS

| | | |
|---|---|---|
| 2,258,218 | Rochow | Oct. 7, 1941 |
| 2,541,137 | Warrick | Feb. 13, 1951 |
| 2,610,167 | Grotenhuis | Sept. 9, 1952 |
| 2,637,719 | Dereich | May 5, 1953 |

UNITED STATES PATENT OFFICE
CERTIFICATE OF CORRECTION

Patent No. 2,890,188                                June 9, 1959

George M. Konkle et al.

It is hereby certified that error appears in the printed specification of the above numbered patent requiring correction and that the said Letters Patent should read as corrected below.

Column 4, line 49, for "878 percent" read — 787 percent —; column 5, line 36, for "150° C." read — 250° C. —; column 6, line 4, for "sanding" read — standing —.

Signed and sealed this 20th day of October 1959.

(SEAL)
Attest:

KARL H. AXLINE
Attesting Officer

ROBERT C. WATSON
Commissioner of Patents